UNITED STATES PATENT OFFICE.

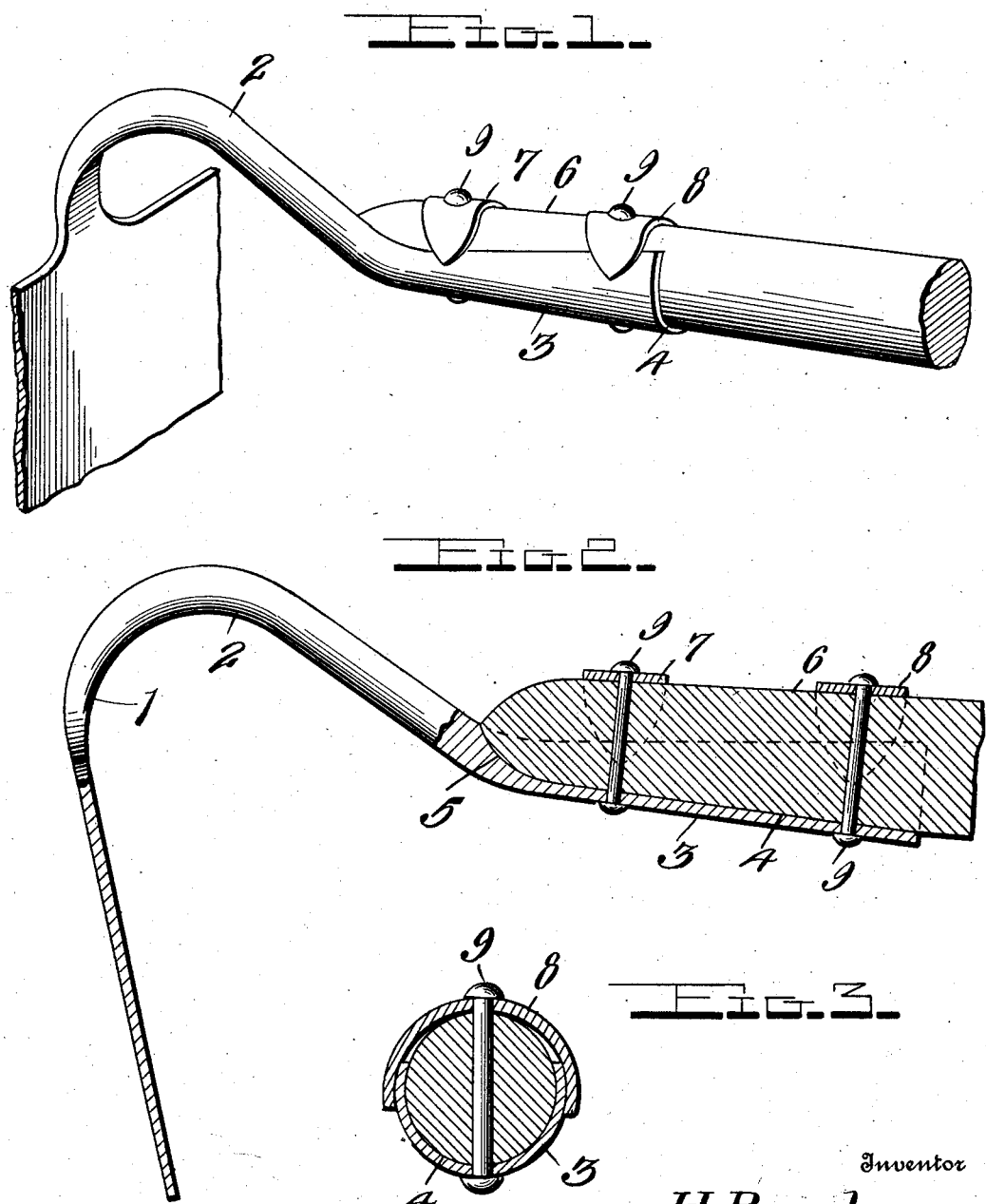

HENRY BURCH, OF LA GRANGE, TENNESSEE.

IMPLEMENT.

997,368.     Specification of Letters Patent.     Patented July 11, 1911.

Application filed January 5, 1911. Serial No. 600,941.

*To all whom it may concern:*

Be it known that I, HENRY BURCH, a citizen of the United States, residing at La Grange, in the county of Fayette and State of Tennessee, have invented certain new and useful Improvements in Implements, of which the following is a specification, reference being had to the accompanying drawings.

My invention relates to improvements in implements, such as hoes, pitch-forks, and the like, and especially with reference to the construction of the shank of the implement and coacting means for attaching a handle thereto, the invention consisting in the construction, combination and arrangement of devices hereinafter described and claimed.

In the accompanying drawings,—Figure 1 is a perspective view of an implement provided with a shank and handle attaching devices constructed in accordance with my invention. Fig. 2 is a longitudinal sectional view of the same. Fig. 3 is a transverse sectional view of the same.

The implement head A may be that of a hoe, or a pitchfork or any other implement, my invention being applicable to implements of various kinds. In accordance with my invention, the implement head is provided with a shank 1, which is curved to form a goose-neck 2, and is provided with a comparatively straight arm 3, forming the terminal of the shank. The said arm of the shank is semi-tubular in form in cross section, and the same narrows and tapers toward the goose-neck, so that a tapering socket 4, or ferrule is formed in and by the said arm 3 which socket or ferrule is semi-tubular cross-sectionally at all points excepting its inner end which inner end 5 is formed by the goose-neck or that portion thereof which is merged into the said arm.

The inner portion of the handle is placed in the said socket or ferrule, and the extreme inner end of the handle bears against the stop 5. The handle is indicated at 6. A pair of clips 7, 8 each of which is semi-cylindrical in form are placed on the handle at points opposite the ferrule or socket of the arm 3, and the said clips, handle and arm are secured together by means of rivets or other like devices 9. The ends of the clip 8 overlap and engage the outer sides of the larger outer end portion of the said semi-tubular arm 3, so that the said clip acts to bend the sides of the said semi-tubular arm or ferrule firmly against those of the handle. Hence the ferrule is diametrically adjustable according to the size of the handle and the clip which coacts with the ferrule causes the handle to be firmly engaged and clamped by and between the ferrule and the clip. In the event that the handle shrinks, the clip 8 may be set up on the rivet or connecting device 9 to prevent the handle from working loose in and between the ferrule and the clip. By forming the stop 5 by the goose-neck portion of the shank, and causing the inner end of the handle to engage the said stop, the rivets or connecting devices 9 are to a large extent relieved of the stress incident to the use of the implement and the handle is prevented from working longitudinally in the ferrule.

I claim:—

The herein described implement comprising a shank provided with a goose-neck portion and with an arm forming an extension thereof and also forming a substantially semi-tubular ferrule open on its upper side and tapered longitudinally toward the goose-neck, said goose-neck rising from the bottom of and forming a stop at the inner end and united to and connecting the sides of the ferrule, a handle having its inner portion disposed in the ferrule and its outer end engaged by the said stop, semi-circular clips on the handle and opposite the ferrule and overlying and engaging the sides thereof, and fastening devices extending through the handle, the clips and the ferrule and securing them together, the overlying ends of the clips co-acting with the fastening devices to firmly clamp the sides of the ferrule against the handle.

In testimony whereof I hereunto affix my signature in the presence of two witnesses.

HENRY BURCH.

Witnesses:
   ED SMITH,
   GRACHY FARLEY.

Copies of this patent may be obtained for five cents each, by addressing the "Commissioner of Patents, Washington, D. C."